United States Patent
Du et al.

(10) Patent No.: US 10,931,641 B1
(45) Date of Patent: Feb. 23, 2021

(54) HARDWARE CONTROL LOGIC BASED DATA FORWARDING CONTROL METHOD AND SYSTEM

(71) Applicant: BEIJING BEYONDINFO TECHNOLOGY CO., LTD., Beijing (CN)

(72) Inventors: Hua Du, Beijing (CN); Wei Ai, Beijing (CN); Zhenhe Cai, Beijing (CN); Hao Zhang, Beijing (CN)

(73) Assignee: Beijing Beyondinfo Technology Co., Ltd., Beijing (CN)

( * ) Notice: Subject to any disclaimer, the term of this patent is extended or adjusted under 35 U.S.C. 154(b) by 0 days.

(21) Appl. No.: 16/978,777

(22) PCT Filed: Jan. 16, 2019

(86) PCT No.: PCT/CN2019/072031
§ 371 (c)(1),
(2) Date: Sep. 8, 2020

(87) PCT Pub. No.: WO2020/087783
PCT Pub. Date: May 7, 2020

(30) Foreign Application Priority Data

Oct. 29, 2018 (CN) .......................... 201811264760.8

(51) Int. Cl.
*H04L 29/06* (2006.01)
*G06F 21/53* (2013.01)

(52) U.S. Cl.
CPC ............ *H04L 63/029* (2013.01); *G06F 21/53* (2013.01); *H04L 63/08* (2013.01); *G06F 2221/033* (2013.01)

(58) Field of Classification Search
CPC ....... H04L 63/029; H04L 63/08; G06F 21/53; G06F 2221/033
See application file for complete search history.

(56) References Cited

U.S. PATENT DOCUMENTS 8,613,070 B1 * 12/2013 Borzycki ................ H04L 67/10
726/8
8,726,343 B1 * 5/2014 Borzycki ............ H04L 63/0815
726/1
(Continued)

FOREIGN PATENT DOCUMENTS

CN 103020546 A * 4/2013
CN 103020546 A 4/2013
(Continued)

OTHER PUBLICATIONS

Google Translation of CN106022094 (Year: 2016).*
(Continued)

*Primary Examiner* — Luu T Pham
*Assistant Examiner* — James J Wilcox
(74) *Attorney, Agent, or Firm* — Zhu Lehnhoff LLP (57) ABSTRACT

The present invention discloses a hardware control logic based data forwarding control method and a corresponding data forwarding control system. The method includes: externally connecting a terminal protection device to a protected host, and taking over all the data interfaces of the protected host; and controlling by a hardware control logic in the terminal protection device the connection and/or disconnection of a physical circuit corresponding to data forwarding when an external device interacts data with the protected host via the terminal protection device, so as to control the data interaction between the external device and the protected host. The present invention realizes the functions of performing control and security protection on various types of data without installing data monitoring and security protection software on the protected host, and achieves the effects of isolating the physical circuit via the hardware control logic and better controlling data forwarding security, thereby comprehensively eliminating the potential security (Continued)

S1
Externally connecting a terminal protection device to a protected host, and taking over all the data interfaces of the protected host; and S2
Controlling by a hardware control logic in the terminal protection device the connection and/or disconnection of a physical circuit corresponding to data forwarding when an external device interacts data with the protected host via the terminal protection device, so as to control the data interaction between the external device and the protected host.

hazards such as Trojan virus implantation and malicious code injection that may be generated by the interfaces.

7 Claims, 5 Drawing Sheets

(56) References Cited

U.S. PATENT DOCUMENTS

| | | | | |
|---|---|---|---|---|
| 9,224,013 | B2* | 12/2015 | Buer | G06F 12/1408 |
| 10,002,246 | B2* | 6/2018 | Buer | G06F 21/76 |
| 2004/0107360 | A1* | 6/2004 | Herrmann | H04L 63/08 |
| | | | | 726/1 |
| 2006/0072241 | A1 | 4/2006 | Feliss et al. | |
| 2007/0171921 | A1* | 7/2007 | Wookey | G06F 9/5027 |
| | | | | 370/401 |
| 2007/0174410 | A1* | 7/2007 | Croft | H04L 67/28 |
| | | | | 709/208 |
| 2007/0174429 | A1* | 7/2007 | Mazzaferri | H04L 67/02 |
| | | | | 709/218 |
| 2007/0179955 | A1* | 8/2007 | Croft | H04L 63/10 |
| 2007/0180447 | A1* | 8/2007 | Mazzaferri | H04L 67/02 |
| | | | | 718/1 |
| 2007/0180448 | A1* | 8/2007 | Low | G06F 9/5055 |
| | | | | 718/1 |
| 2007/0180449 | A1* | 8/2007 | Croft | H04L 67/2819 |
| | | | | 718/1 |
| 2007/0180450 | A1* | 8/2007 | Croft | G06F 9/5077 |
| | | | | 718/1 |
| 2007/0180493 | A1* | 8/2007 | Croft | G06F 9/5088 |
| | | | | 726/2 |
| 2007/0186212 | A1* | 8/2007 | Mazzaferri | G06F 3/1438 |
| | | | | 718/1 |
| 2007/0192329 | A1* | 8/2007 | Croft | H04L 67/141 |
| 2007/0198656 | A1* | 8/2007 | Mazzaferri | G06F 9/54 |
| | | | | 709/218 |
| 2008/0148048 | A1* | 6/2008 | Govil | G06F 21/53 |
| | | | | 713/164 |
| 2008/0246850 | A1* | 10/2008 | Marlowe | H04B 1/205 |
| | | | | 348/222.1 |
| 2010/0011139 | A1* | 1/2010 | Wang | G06F 13/4221 |
| | | | | 710/110 |
| 2014/0075567 | A1* | 3/2014 | Raleigh | G06Q 20/20 |
| | | | | 726/26 |
| 2014/0098671 | A1* | 4/2014 | Raleigh | G06Q 40/12 |
| | | | | 370/235 |
| 2014/0108486 | A1* | 4/2014 | Borzycki | H04L 67/10 |
| | | | | 709/201 |
| 2014/0108538 | A1* | 4/2014 | Borzycki | G06F 9/543 |
| | | | | 709/204 |
| 2014/0108558 | A1* | 4/2014 | Borzycki | H04L 63/0815 |
| | | | | 709/205 |
| 2014/0108599 | A1* | 4/2014 | Borzycki | H04L 67/10 |
| | | | | 709/217 |
| 2014/0108792 | A1* | 4/2014 | Borzycki | H04L 67/32 |
| | | | | 713/165 |
| 2014/0123265 | A1* | 5/2014 | Borzycki | G06F 21/53 |
| | | | | 726/8 |
| 2015/0271296 | A1* | 9/2015 | Borzycki | H04L 67/104 |
| | | | | 709/202 |
| 2016/0078223 | A1* | 3/2016 | Buer | G06F 21/602 |
| | | | | 713/189 |
| 2016/0205205 | A1* | 7/2016 | Li | G06F 16/958 |
| | | | | 709/202 |
| 2017/0208038 | A1* | 7/2017 | Hinaman | H04L 63/083 |
| 2017/0235967 | A1* | 8/2017 | Ray | G06F 21/54 |
| | | | | 713/165 |
| 2017/0310686 | A1* | 10/2017 | Ray | H04L 63/0876 |
| 2017/0353496 | A1* | 12/2017 | Pai | H04L 67/02 |
| 2017/0364677 | A1* | 12/2017 | Soman | G06F 21/53 |
| 2018/0004937 | A1* | 1/2018 | Shannon | G06F 21/51 |
| 2018/0075249 | A1* | 3/2018 | Ray | G06F 21/554 |
| 2018/0268132 | A1* | 9/2018 | Buer | G06F 21/76 |
| 2019/0034666 | A1* | 1/2019 | Boivie | G06F 21/74 |
| 2019/0042732 | A1* | 2/2019 | Desai | G06F 21/53 |
| 2019/0132739 | A1* | 5/2019 | Raleigh | H04L 41/046 |
| 2019/0250938 | A1* | 8/2019 | Claes | G06F 9/45533 |
| 2019/0303204 | A1* | 10/2019 | Masputra | G06F 9/5005 |
| 2019/0306281 | A1* | 10/2019 | Masputra | G06F 9/4881 |

FOREIGN PATENT DOCUMENTS

| | | | |
|---|---|---|---|
| CN | 103532978 A | | 1/2014 |
| CN | 103532980 A | * | 1/2014 |
| CN | 103532980 A | | 1/2014 |
| CN | 106022094 A | * | 10/2016 |
| CN | 106022094 A | | 10/2016 |
| CN | 206003099 U | | 3/2017 |

OTHER PUBLICATIONS

Google Translation of CN103532980 (Year: 2013).*
Google Translation of CN103020546 (Year: 2012).*
Lee et al "Enhancing the Isolation and Performance of Control Planes for Fog Computing," pp. 1-17, Sep. 28, 2018 (Year: 2018).*
International Search Report in PCT/CN2019/072031, issued by ISA, dated Jan. 16, 2019.
Written Opinion of the International Search Report in PCT/CN2019/072031, issued by ISA, dated Jun. 27, 2019.

* cited by examiner

HARDWARE CONTROL LOGIC BASED DATA FORWARDING CONTROL METHOD AND SYSTEM

TECHNICAL FIELD

The present invention relates to the technical field of computer security, and more particularly to a hardware control logic based data forwarding control method and a corresponding data forwarding control system.

BACKGROUND

In recent years, the computer and network technology develops rapidly, thereby greatly promoting the popularization of networks. While people are enjoying the convenience brought by the network, the technology also brings new threats to data security in computers used by people in production/life, such as the following common threats: malicious code intrusion, virus/Trojan Horse infection, flow attack, hacker stealing, unauthorized access, personating a valid user, destroying data integrity, interfering normal system operation, utilizing a network to spread virus, man-in-the-middle eavesdrop and the like.

The technical means to solve the problem of intranet computer network data security are varied, for example, installing and using a network security product in a host such as a black/white list, flow control software, a firewall, an anti-virus and intrusion detection system and the like. However, even if the above measures are taken, various network security events still occur frequently. According to statistics, 70% of computer crimes occur because an internal person illegally uses a key resource such as the host and the like, and the threats really coming from the outside are only 30%. The internal person lacks security awareness when using the host. The behaviors of the internal person at the back end of the firewall, such as nonstandard access of various external devices, data leakage, virus infection, system crash and even network paralysis due to virus or Trojan Horse implantation, system mis-operation or intentional damage, would result in dreadful influence on or bring heavy loss to organizations, enterprises and institutions. Furthermore, for certain special devices, such as a host equipped with a special software control, and a device at an engineer station/staff station in certain industrial fields, generally no data control software and security protection software adapted to the system of the host/device is sold on the market because the system is special or because the data control software or the security software is easy to cause the compatibility problem of the original software of the host, and even influence performance. In addition, the host of the engineer station/staff station basically does not upgrade an operating system after the host gets on line. Even after flow monitoring security software is installed, the host generally does not update an anti-malicious code software version or a malicious code library in time, and thus cannot play an overall data flow control and security protection roles.

SUMMARY

On the basis of the existing status, the present invention provides a hardware control logic based data forwarding control method and a system to solve the above problem. In the present invention, various interfaces of a protected host are taken over, and the use of a USB interface or a serial interface device of the protected host must be completed via the external terminal protection device, such that the data control and security protection can be performed on the USB interface or serial interface of the protected host without installing security protection software on the protected host.

In a first aspect, the present application provides a hardware control logic based data forwarding control method. The method includes: externally connecting a terminal protection device to a protected host, and taking over all the data interfaces of the protected host; and controlling by a hardware control logic in the terminal protection device the connection and/or disconnection of a physical circuit corresponding to data forwarding when an external device interacts data with the protected host via the terminal protection device, so as to control the data interaction between the external device and the protected host.

Optionally, taking over all the data interfaces of the protected host further includes: respectively correspondingly one-to-one connecting all the data interfaces of the protected host to a plurality of internal interfaces on the terminal protection device according to interface types.

Optionally, the hardware control logic switches on a physical circuit between an external interface in the terminal protection device and a system control module, performs security authentication on the external device via the system control module, and determines whether the external device is a licensed access device.

Optionally, after the system control module performs security authentication on the external device and determines that the external device is not a licensed access device, the hardware control logic disconnects a physical circuit between the external interface accessing the external device and the other interfaces, so as to filter and forbid the data transmission after the external device is accessed; and/or after the system control module performs security authentication on the external device and determines that the external device is a licensed access device, the hardware control logic switches on a physical circuit between the external interface accessing the external device and the internal interface accessing the protected host, so as to realize data forwarding between the external device and the protected host.

Optionally, the terminal protection device further comprises an interface control module; the hardware control logic, the internal interface, the external interface, and a forwarding interface are disposed on the interface control module; and the forwarding interface is connected to the system control module.

Optionally, when the external device needs to import data to the protected host, the hardware control logic switches on a physical circuit between the external interface accessing the external device and the forwarding interface, keeps a physical circuit between the forwarding interface and the other interfaces in a disconnected state, transmits the imported data to the system control module only via the forwarding interface, and keeps the protected host in a data isolation state.

Optionally, when the protected host is in the data isolation state, the system control module performs security detection on the imported data; and after the imported data passes the security detection, an internal memory in the interface control module isolates and stores the imported data.

Optionally, before the step of isolating and storing the imported data by an internal memory in the interface control module, the method further includes: switching on by the hardware control logic a physical circuit between the forwarding interface and the internal memory of the interface control module, disconnecting physical circuits between the external interface and the forwarding interface, and between the internal memory and the internal interface, and copying the imported data to the internal memory of the interface control module via the forwarding interface.

Optionally, the hardware control logic disconnects a physical circuit between the external interface and the internal memory, switches on the physical circuit between the internal memory and the internal interface, and transmits the imported data in the internal memory to the protected host via the internal interface, in which process the hardware control logic keeps the physical circuit between the external interface and the forwarding interface, and a physical circuit between the forwarding interface and the internal memory in the disconnected state; and the protected host receives the imported data via the internal interface.

Optionally, when the protected host needs to export data to the external device, an internal memory in the interface control module isolates and stores the exported data.

Optionally, the hardware control logic switches on a physical circuit between the internal memory and the internal interface, transmits the exported data in the protected host to the internal memory via the internal interface, and keeps a physical circuit between the internal memory and the other interfaces in the disconnected state.

Optionally, after the step of transmitting the exported data in the protected host to the internal memory via the internal interface, the method further includes: disconnecting by the hardware control logic the physical circuit between the internal memory and the internal interface, and switching on a physical circuit between the internal memory and the forwarding interface; transmitting the exported data in the internal memory to the system control module via the forwarding interface; and performing compliance check on the exported data by the system control module, determining whether the exported data complies with a preset compliance policy, and keeping by the hardware control logic physical circuits between the external interface and the forwarding interface, and between the internal interface and the internal memory in the disconnected state.

Optionally, after the exported data passes the compliance check, the hardware control logic switches on the physical circuit between the external interface accessing the external device and the forwarding interface, and copies the exported data to the external device accessed to the external interface; furthermore, the hardware control logic keeps the physical circuits between the forwarding interface and the internal memory, and between the internal interface and the internal memory in the disconnected state.

In a second aspect, the present application provides a data forwarding control system, including:
one or more external devices,
a protected host, and
a terminal protection device, internally provided with a hardware control logic, externally connected to the protected host, and taking over all the data interfaces of the protected host, wherein the hardware control logic is used to control the connection and/or disconnection of a data forwarding physical circuit, so as to control the data interaction between the external device and the protected host.

The technical solution of the present invention at least has the following one or more technical effects: the present invention can take over various data interfaces of the protected host, so as to ensure that the data interaction communications of the interfaces of the protected host are all completed via the external device; the present invention realizes the functions of performing control and security protection on various types of data of the protected host without installing flow monitoring and security protection software on the protected host, isolates the physical circuit via the hardware control logic, achieves the effect of physical isolation during data forwarding and storing, and is more remarkably secure and effective than pure software control; moreover, the present invention further achieves the security protection object, greatly reduces network security risk of the entire system, and comprehensively eliminates potential security hazards such as Trojan Horse virus implantation and malicious code injection that may be generated by the interfaces.

DETAILED DESCRIPTION

The exemplary embodiments of the present disclosure will be described in details hereafter with reference to the drawings. Although the exemplary embodiments of the present disclosure are shown in the drawings, it should be understood that the present disclosure can be realized in various forms and shall not be limited to the embodiments elaborated herein. On the contrary, the embodiments are provided such that the present disclosure can be understood more thoroughly and the scope of the present disclosure can be completely conveyed to a person skilled in the art.

The term "and/or" herein only describes an association relationship between associated objects, and can denote three relationships, for example, A and/or B can denote A, both A and B, and B. In addition, the character "/" herein generally denote that the former and latter associated objects are in an "or" relationship.

The hardware control logic based data forwarding control method provided by the present invention includes: externally connecting a terminal protection device to a protected host, and taking over all the data interfaces of the protected host; and controlling by a hardware control logic in the terminal protection device the connection and/or disconnection of a physical circuit corresponding to data forwarding when an external device interacts data with the protected host via the terminal protection device, so as to control the data interaction between the external device and the protected host. Therefore, the present invention provides a hardware control logic based data forwarding control method, realizes the functions of performing control and security protection on various types of data without installing flow monitoring and security protection software on the protected host, and isolates the physical circuit via the hardware control logic, thereby comprehensively eliminating the potential security hazards such as Trojan virus implantation and malicious code injection that may be generated by the interfaces.

It should be noted that the term "module" in the present invention is a hardware module consisting of tangible electronic elements such as a circuit, a data processing apparatus, a memory, a buffer and the like. In the present invention, the interface control module and the system control module can be a physically or functionally independent element combination, and can also be a physically or functionally integrated integral element combination. For example, as an embodiment, the interface control module consists of an interface control board, and the system control module consists of a system control board; the interface control board and the system control board are both circuit boards integrated with electronic elements, and are connected via a bus. In other embodiments, the interface control module and the system control module can also be integrated on one circuit board. Therefore, the key of the present invention is a control relationship between the interface control module and the system control module, but not limited to the space or physical connection combination modes of the electronic elements forming the modules.

Embodiment

Figure 1:
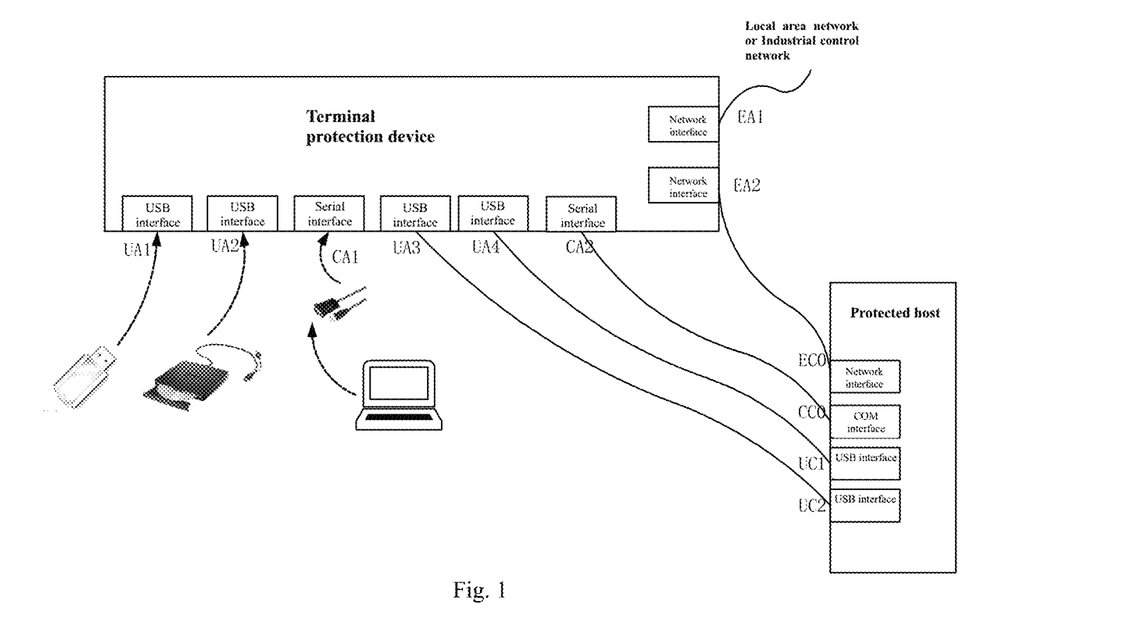
FIG. 1 is an application scenario of the data forwarding control system according to the present invention.

FIG. 1 shows an application scenario of the data forwarding control system according to the present invention.

As shown in FIG. 1, in order to control the data forwarding of the protected host, all the interfaces of the protected host need to be taken over. Therefore, in the method provided by the present invention, the terminal protection device is provided with internal interfaces corresponding to the interfaces of the protected host, and is further provided with corresponding types of external interfaces, wherein the internal interface is used to connect the protected host, and the external interface is used to connect the external device which needs to interact data with the protected host. The external terminal protection device is externally connected to the protected host; the interfaces (such as USB interfaces UC1, UC2, a COM interface CC0, a network interface EC0) on the protected host to be protected are connected to corresponding types of internal interfaces of the external terminal protection device via various types of connecting wires, for example, the interfaces UC1 and UC2 of the protected host are respectively connected to internal USB interfaces UA4 and UA3 of the external terminal protection device, the serial interface CC0 is connected to an internal serial interface CA2, and the network interface EC0 is connected to an internal network interface EA2. Various external devices (a U disk, an optical disk driver, a serial interface connection device and the like) all access the external interfaces of the terminal protection device, and can perform data interaction communication with the protected host only via the terminal protection device, so as to control the data forwarding between the external device and the protected host, for example, an external U disk device accesses an external interface UA1 of the terminal protection device, the USB optical disk driver accesses an external interface UA2, and the serial interface connection device accesses an external interface CA1. The external devices such as a U disk, a USB optical disk driver, and a serial interface connection device which need to communicate data with the protected host cannot directly access the protected host, but must access corresponding external interfaces of the external terminal protection device to perform forwarding communication.

In this way, the data transmitted by the external device first needs to pass the data flow control of the external terminal protection device, and then the external terminal protection device can perform forwarding control on data transmission, and can further control the data transmission by means of protocol filtration, flow mirroring, flow auditing, security detection and the like.

Figure 2:
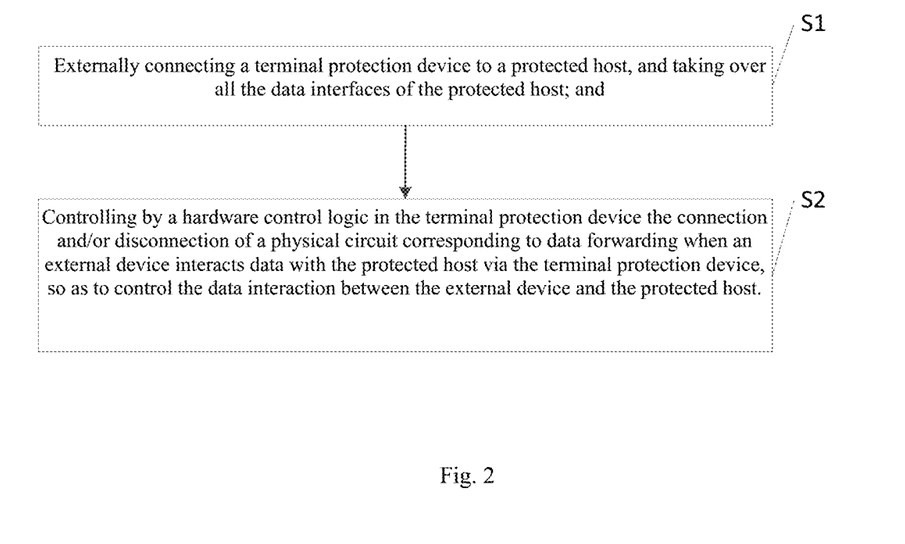
FIG. 2 is a flow chart of the data forwarding control method according to the present invention.

FIG. 2 is a flow chart of the data forwarding control method according to the present invention. The method includes the following steps:

S1, externally connecting a terminal protection device to a protected host, and taking over all the data interfaces of the protected host; and S2, controlling by a hardware control logic in the terminal protection device the connection and/or disconnection of a physical circuit corresponding to data forwarding when an external device interacts data with the protected host via the terminal protection device, so as to control the data interaction between the external device and the protected host.

The terminal protection device further includes an interface control module and a system control module, wherein the interface control module is internally provided with the hardware control logic, the internal interface, the external interface, and a forwarding interface; the external interface accesses various types of external devices; and the forwarding interface is connected to the system control module.

In step S1, further, in order to respectively correspondingly one-to-one connect all the data interfaces of the protected host to a plurality of internal interfaces on the terminal protection device and enable the terminal protection device to take over all the data interfaces of the protected host, all the external devices which may be directly connected to the protected host are shielded, wherein the data interfaces include but not limited to a USB interface, a serial interface, a parallel interface, and/or a network interface.

In step S2, on the basis of the operation of the hardware control logic, the connection and disconnection of the physical circuit in the terminal protection device are controlled, so as to play data forwarding control and physical isolation roles.

Taking the situation that the external device is a non-storage type direct connection device (such as a USB optical disk driver, an encryption lock, a bank U shield, a keyboard, a mouse, a display device and the like) as an example, the hardware control logic switches on a physical circuit between an external interface of the direct connection device and the system control module, such that the system control module performs security authentication on the direct connection device, and determines whether the direct connection device is a licensed access device. If the direct connection device is determined not to be a licensed access device, then the system control module notifies the hardware control logic of isolating the external interface accessing the direct connection device and disconnecting the physical circuits of the external interface and each interface, so as to filter and forbid the data transmission after the direct connection device is accessed; and if the direct connection is determined to be a licensed access device, then the hardware control logic switches on a physical circuit between the external interface accessing the direct connection device and the internal interface accessing the protected host, so as to realize data forwarding between the direction connection device (equivalent to the external device) and the protected host.

Taking the situation that the external device is a storage type device as an example, when the storage type device needs to import data to the protected host, the hardware control logic switches on a physical circuit between the external interface accessing the storage type device and the forwarding interface, keeps a physical circuit between the forwarding interface and the other interfaces in a disconnected state, transmits the imported data to the system control module only via the forwarding interface, and keeps the protected host in a data isolation state. When the protected host is in the data isolation state, the system control module performs security detection on the imported data; and after the imported data passes the security detection, an internal memory in the interface control module isolates and stores the imported data. In order to perform isolation and forwarding, the hardware control logic switches on a physical circuit between the forwarding interface and the internal memory of the interface control module, disconnects physical circuits between the external interface and the forwarding interface, and between the internal memory and the internal interface, and copies the imported data to the internal memory of the interface control module via the forwarding interface. Afterwards, the hardware control logic disconnects a physical circuit between the external interface and the internal memory, switches on the physical circuit between the internal memory and the internal interface, and transmits the imported data in the internal memory to the protected host via the internal interface, in which process the hardware control logic keeps the physical circuit between the external interface and the forwarding interface, and a physical circuit between the forwarding interface and the internal memory in the disconnected state; and finally, the protected host receives the imported data via the internal interface.

Still taking the situation that the external device is a storage type device as an example, when the protected host needs to export data to the storage type device, an internal memory in the interface control module is required to isolate and store the exported data; first, the hardware control logic switches on the physical circuit between the internal memory and the internal interface, transmits the exported data in the protected host to the internal memory via the internal interface, and keeps the physical circuit between the internal memory and other interfaces in a disconnected state; afterwards, the hardware control logic disconnects the physical circuit between the internal memory and the internal interface, switches on a physical circuit between the internal memory and the forwarding interface, and transmits the exported data in the internal memory to the system control module via the forwarding interface; the system control module performs compliance check on the exported data, determines whether the exported data complies with a preset compliance policy; and the hardware control logic keeps the physical circuits between the external interface and the forwarding interface, and between the internal interface and the internal memory in the disconnected state. After the exported data passes the compliance check, the hardware control logic switches on the physical circuit between the external interface accessing the storage type device and the forwarding interface, and finally copies the exported data to the storage type device accessed to the external interface, in which process the hardware control logic keeps the physical circuits between the forwarding interface and the internal memory, and between the internal interface and the internal memory in the disconnected state.

Therefore, on the basis of the data forwarding control method of the present invention, no matter the external device is a direct connection device or a storage type device which needs to import/export data, the connection and disconnection of an internal physical circuit must be controlled via the hardware control logic, so as to realize the forwarding, storage, isolation, and authentication of the data imported to and exported from the protected host, thereby ensuring data forwarding security protection.

Figure 3:
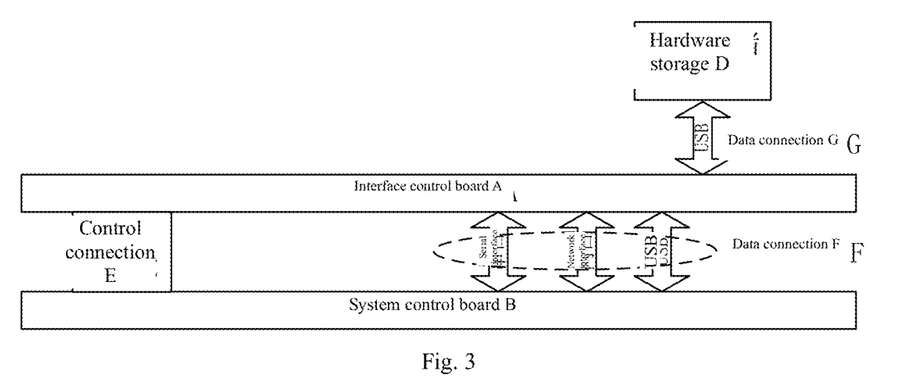
FIG. 3 is a schematic view of an internal structure of the terminal protection device according to the present invention.

FIG. 3 shows an embodiment of an internal structure of the terminal protection device according to the present invention.

In the embodiment, the terminal protection device mainly consists of an interface control board A and a system control board B, wherein the interface control board A is internally provided with a hardware control logic; the hardware control logic supports the data forwarding communication of the physical circuit via a USB interface, a serial interface and a network interface. The interface control board is connected to the system control board B via a connecting control line E (for example, a bus); and the system control board B is used to control different operating modes of interfaces on the interface control board A, such as the USB interface, the serial interface, and the network interface, so as to realize the function of performing security control on the access of various external devices. The system control board A can control the operating mode of each interface; the operating mode includes: available, not available, network protocol filtration, flow mirroring, flow auditing and the like. However, the present invention is not limited to specific operating mode control types. The system control board B can be connected to the interface control board A via an interface I2C or SPI. However, the present invention is not limited to such specific control connection interfaces. The interface control board forwards, via various types of forwarding interfaces (the serial interface, the network interface and the USB in a data connection F), the data flow transmitted in the external interface and the internal interface to the system control board.

The interface control board in the terminal protection device needs to access an internal memory, such as the hardware storage D in FIG. 2; the internal memory is used to isolate and store the data exchanged between the interface control board and the interfaces.

When an external device accesses an external interface of the interface control board, the system control board performs security authentication on the interface of the interface control board according to a preset security policy, so as to determine whether the external device is a licensed access device.

In the embodiment, the security functions realized by the terminal protection device include but not limited to: an administrator presets a permission and a security policy for the external terminal protection device; the security policy includes but not limited to: a data import enabling policy (for example, a USB interface), a data export enabling policy (for example, a USB interface), a USB access device limitation policy (for example, a USB device based vendor ID, namely a supplier identification code, and/or a product ID, namely a product identification code), a data import antivirus policy, a policy for controlling data export black and white lists, a data export format control policy, a serial interface access enabling policy, a USB interface plug-in protection policy, a network communication audit enabling policy, a firewall function enabling policy, a policy for serial interface command black and white lists and the like.

In a preferred embodiment, the security policy includes: after the administrator sets the security policies, the relevant security policies will be executed by the terminal protection device one by one.

In a preferred embodiment, the security policy includes: the administrator further controls whether the terminal protection device enters a monitoring protection mode, in which mode the connection with the protected host will be monitored and an alarm will be sent in case of abnormality.

In a preferred embodiment, the security policy includes: when an abnormality alarm or an interface access situation needs to be recorded for the administrator to query subsequently, the internal memory is further used to record alarm information or interface access log information.

Figure 4:
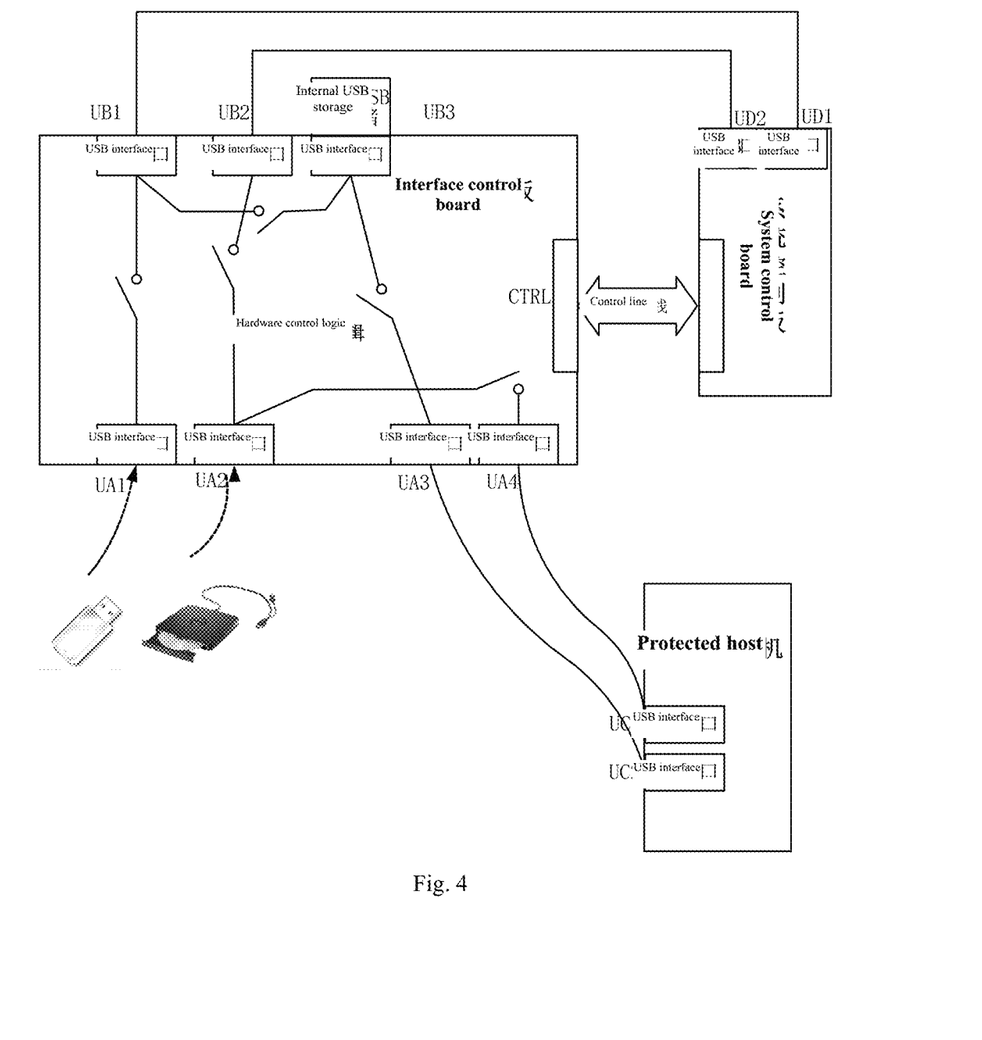
FIG. 4 is a USB data forwarding control embodiment according to the present invention.

The hardware control logic realizes the connection and disconnection of a physical circuit between the interfaces in the interface control board. In a preferred embodiment, after the system control board performs security authentication on the external device through the security policy and determines that the external device is not a licensed access device, the system control board notifies, via a bus, the hardware control logic of the interface control board of keeping a physical circuit between the external interface accessing the external device and the forwarding interface in a disconnected state, so as to filter and forbid the data transmission after the external device is accessed. After the system control board performs security authentication on the external device and determines that the external device is a licensed access device, the system control board notifies, via a bus, the interface control board of allowing the data transmission of the external device; and the hardware control logic of the interface control board switches on the physical circuit between the external interface accessing the external device and the forwarding interface. FIG. 4 shows a USB data forwarding control embodiment according to the present invention.

The interface control board includes a hardware control logic, for realizing the connection and disconnection of a physical circuit between the interfaces in the interface control board; the internal USB interface UA3 of the interface control board is connected to the USB interface of the protected host; the forwarding interfaces UB1 and UB2 are respectively connected to the USB interfaces UD3 and UD4 of the system control board; an external device U disk to be accessed or a mobile storage medium is plugged in the external USB interface UA1; an internal USB storage for storing data is plugged in UB3; a CTRL interface, as a bus interface, is connected to a control interface of the system control board.

When data in the external device U disk needs to be imported to the protected host, the system control board transmits a control instruction to the interface control board via the bus, so as to control the hardware control logic to switch on a physical circuit between UA1 and UB1 and copy the data Data1 in the U disk to a buffer memory of the system control board; in the meanwhile, the hardware control logic keeps a physical circuit between the forwarding interface UB1 (connected to the system control board) and UB3 (connected to the internal USB storage) in the disconnected state, and keeps a physical circuit between the internal USB interface UA3 (connected to the protected host) and UB3 in the disconnected state.

Afterwards, the hardware control logic disconnects the physical circuit between UA1 and UB1, switches the physical circuit between UB1 and UB3, and accesses the data of the internal USB storage of UB3 to the interface UB1; the system control board performs security detection on the data Data1 in the buffer memory; therefore, the system control board can perform security detection, such as virus killing, on the USB storage plugged in the UA1 under the situation that the protected host is isolated. After Data1 passes the security detection, the data Data1 is copied to the internal USB storage of the interface UB3 of the interface control board. In the meanwhile, the hardware control logic controls the physical connections between UA1 and UB1, and between UA3 and UB3 in the disconnected state. Afterwards, the hardware control logic disconnects the physical connection between UB1 and UB3, and switches on the physical circuit between UA3 and UB3, and transmits the data Data1 in the internal USB storage on the interface UB3 to the protected host via the internal interface UA3. In the meanwhile, the hardware control logic disconnects the physical circuits between UA1 and UB1, and between UB1 and UB3.

Correspondingly, when data in the protected host needs to be exported to the external device U disk, the system control board transmits a control instruction to the interface control board via the bus, so as to control the hardware control logic to switch on the physical circuit between UA3 and UB3; the internal USB storage on the interface UB3 is digitally connected to the protected host; a user operates the protected host B, and imports data Data2 to the internal USB storage. In the meanwhile, the hardware control logic keeps the physical circuits between the external interface UA1 and the forwarding interface UB1, and between UB1 and UB3 in the disconnected state. Afterwards, the hardware control logic disconnects the physical circuit between UA3 and UB3, switches on the physical circuit between UB1 and UB3, and forwards the data Data2 in the internal USB storage on the interface UB3 to the buffer memory of the system control board via the forwarding interface UB1; the system control board performs compliance check on the data Data2 in the buffer memory, and determines whether the exported data complies with a preset compliance policy. In the meanwhile, the hardware control logic keeps the physical circuits between the external interface UA1 and the forwarding interface UB1, and between the internal interface UA3 and UB3 in the disconnected state. After the exported data Data2 is determined to pass the compliance check, the hardware control logic switches on the physical circuit between the external interface UA1 and the forwarding interface UB1, and copies the data Data2 to the external device U disk of the interface UA1. In the meanwhile, the hardware control logic keeps the physical circuits between the forwarding interfaces UB1 and UB3, and between the internal interface UA3 and UB3 in the disconnected state. Up to this point, a data export process is completed. It can be seen from the control of the hardware control logic in the data import and export processes of the terminal protection device in the embodiment that only one connection is switched on at any time, and the other connections are in the physically disconnected state, thereby ensuring that data flow filtration and forbidding control is performed on all the unidirectionally/bidirectionally transmitted data between the accessed external device and the protected host.

In still another embodiment as shown in FIG. 4, a data forwarding control method for a non-storage type USB direction connection device is further provided; the method is provided mainly for some non-storage type USB devices to be directly accessed, such as a USB optical disk driver. The hardware control logic realizes the control of the data forwarding of the USB optical disk driver; the hardware connection situation is as follows: the internal USB interface UA4 of the interface control board in the terminal protection device is connected to the USB interface of the protected host; the forwarding interface UB2 accesses the USB interface of the system control board; the USB optical disk driver to be directly connected to the protected host B is plugged in the external USB interface UA2; and the CTRL interface of the interface control board is connected to the control interface of the system control board via the bus.

In the embodiment, the terminal protection device adopts the following method to control USB device direct-connection: when the USB optical disk driver to be directly connected to the protected host B is plugged in the external USB interface UA2 of the terminal protection device, the interface control board notifies the system control board via the bus, and the system control board controls the hardware control logic of the interface control board to switch on the physical circuit between the interface UA2 and the forwarding interface UB2, such that the USB optical disk driver plugged in the interface UA2 is connected to the USB interface of the system control board. In the meanwhile, the hardware control logic keeps the physical circuit between the interface UA2 and the internal interface UA4 of the protected host in the disconnected state.

The system control board performs security authentication on the USB optical disk driver on the interface UA2, and determines whether the external device is a licensed access device; after the USB optical disk driver is determined to be a licensed access device, the hardware control logic switches on the physical circuit between the external interface UA2 and the internal interface UA4, so as to connect the USB optical disk driver plugged in the interface UA2 to the protected host.

When the system control board monitors that the connection states of one or more interfaces change, the hardware control logic automatically disconnects the physical circuits between the interfaces and other interfaces. For example, when the external device plugged in the interface UA2 accesses the interface UA4, the system control board monitors in real time the connection state of the external device plugged in the interface UA2 of the interface control board, and automatically disconnects the circuit once the external device is detected to be unplugged from the interface.

Figure 5:
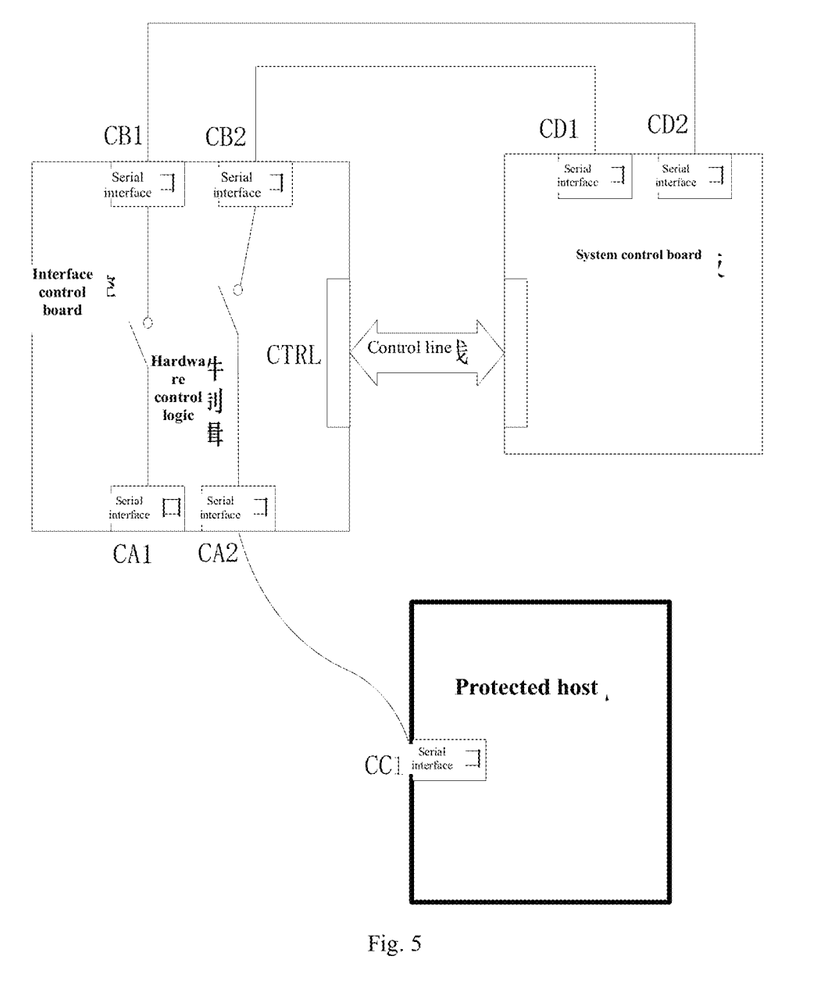
FIG. 5 is a serial interface data forwarding control embodiment according to the present invention.

FIG. 5 shows a serial interface data forwarding control embodiment according to the present invention. With reference to FIG. 5, serial interface communication data can be filtered, and an illegal command can be forbidden from inputting. The hardware control logic of the interface control board controls the disconnection and connection of the physical circuits between the external serial interface CA1 and the forwarding interface CB1, and between the internal serial interface CA2 and the forwarding interface CB2. The external device accessed to the external serial interface CA1 first needs to pass the security authentication of the system control board, and then the serial interfaces CD1 and CD2 exchange data; the hardware control logic of the interface control board switches on the physical circuits between the serial interface CA1 and CB1, and between CA2 and CB2, so as to realize data interaction communication from the external serial device on the external serial interface CA1 to the internal serial interface CA2, and then to the protected host.

Further, the system control board disconnects the physical circuits between CA1 and CB1, and between CA2 and CB2 via the hardware control logic, so as to switch off a serial communication circuit between CA1 and CA2. Since the communication between CA1 and CA2 forwards data via CB1 and CB2, the system control board can filter serial interface communication data and forbid an illegal command from inputting.

In another embodiment as shown in FIG. 5, the terminal protection device has the function of preventing a network cable from being unplugged; the system control board acquires connection states of the external network interface E1 and the internal network interface E2 by reading the state of the register of the network interface in the switching chip, wherein the connection state is described to be: link connection fails/succeeds. The system control board acquires network state information by monitoring the connection state of the network interface E1/E2, and sends an alarm for network cable plug and unplug situations.

Figure 6:
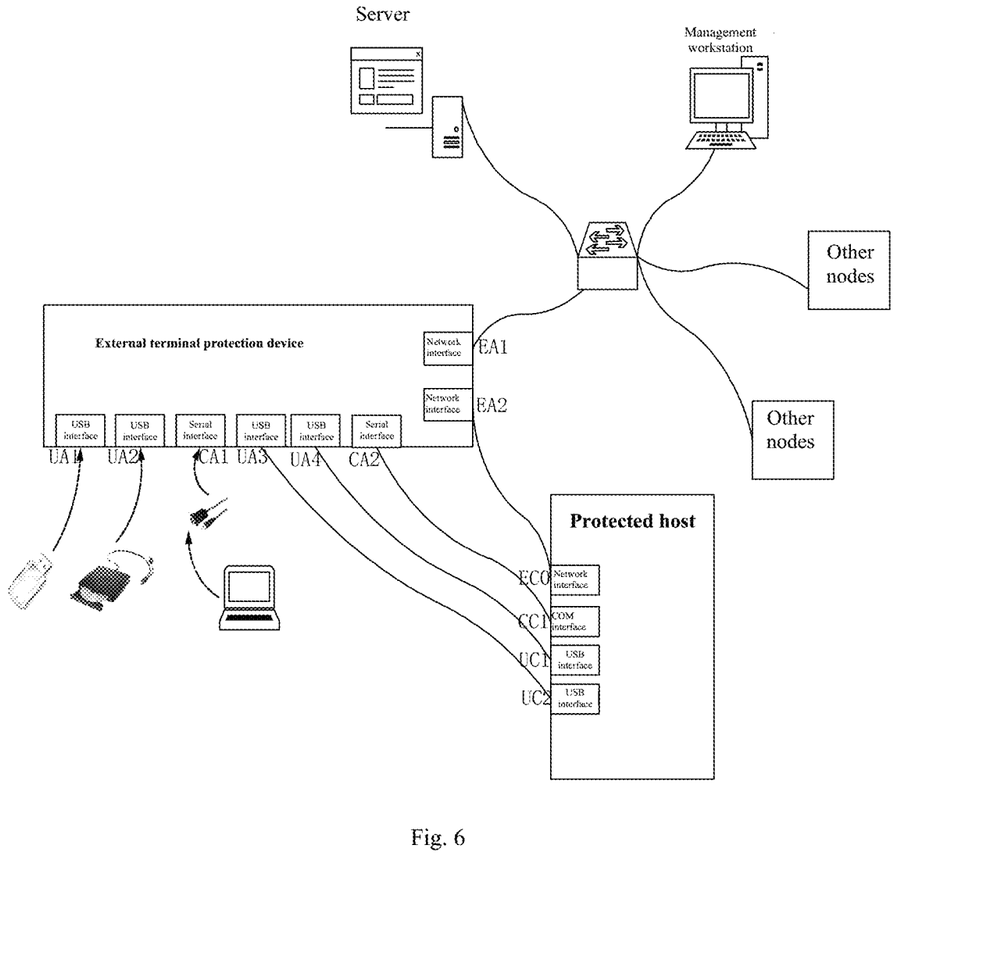
FIG. 6 is a network deployment embodiment of the data forwarding control system according to the present invention.

FIG. 6 is a network deployment embodiment of the data forwarding control system according to the present invention. The data forwarding control system includes one or more external devices, a protected host, and a terminal protection device internally provided with a hardware control logic, wherein the terminal protection device is externally connected to the protected host, and takes over all the data interfaces of the protected host; the hardware control logic is used to control the connection and/or disconnection of a data forwarding physical circuit, so as to control the data interaction between the external device and the protected host. The data forwarding control method is described as above, and will not be repeated here.

Further, the data forwarding control system further includes a control center for remotely controlling the terminal protection device, wherein the control center consists of a server, a management workstation, and other nodes, and is connected to a network interface EA1 of the terminal protection device via a network switching node.

In the description provided herein, a large number of specific details are described. However, it is understood that the embodiments of the invention may be practiced without these specific details. In some examples, well known methods, structures and technologies have not been described in detail as not to obscure understanding of the description.

Similarly, it should be understood that in order to simplify the present disclosure and help people understand one or more aspects of the present invention, in the description of the above exemplary embodiments of the present invention, the features of the present invention sometimes are together grouped into a single embodiment, a figure, or the descriptions thereof. However, the disclosed method should not be interpreted to reflect the following intention: the claimed invention claims more features than the features explicitly stated in each claim. Specifically, as the following claims reflect, the inventive aspects lie in less than all features of a single embodiment disclosed previously. Therefore, claims that follow a specific embodiment are hereby expressly incorporated into the specific embodiment, with each claim standing on its own as a separate embodiment of the disclosure.

Those skilled in the art may understand that the modules in the device in the embodiment may be adaptively changed and set in one or more devices different from the present embodiment. The modules or units or components in the embodiments may be combined into one module or unit or assembly, and furthermore, these may be divided into a plurality of submodules or subunits or sub-assemblies. Except that at least some of such features and/or processes or units are mutually exclusive, all features disclosed in this specification (including the accompanying claims, abstract, and drawings) and all processes or units of any method or device so disclosed may be combined in any combination. Unless otherwise stated, the features disclosed in the specification (including the accompanying claims, abstract, and the drawings) can be replaced with alternative features providing the same, equivalent or similar objects.

In addition, those skilled in the art can understand that although some embodiments described herein include certain features included in other embodiments and not others, combinations of features of different embodiments are meant to be within the scope of the disclosure and form different embodiments. For example, in the following claims, any one of the claimed embodiments may be used in any combination.

The component embodiment of the present invention can be realized as hardware, or a software module operating on one or more processors, or a combination thereof. A person skilled in the art should understand that in practice, a microprocessor or a digital signal processor (DSP) can be used to realize some or the entire functions of some or the entire components of a photographing and recording apparatus, a computing device, and a computer readable storage medium according to the literal contents of the embodiments of the present invention. The present invention can also be realized as a device or an apparatus program (for example, a computer program and a computer program product) for executing a part of or the entire method described herein. Such program realizing the present invention can be stored in a computer readable medium, or can adopt the form having one or more signals. Such signals can be downloaded from an Internet website, or provided on a carrier signal, or provided in any other form.

The invention claimed is:

1. A hardware control logic based data forwarding control method, comprising:
   externally connecting a terminal protection device to a protected host, wherein the terminal protection device comprises an interface control module and a system control module; configuring a hardware control logic module, an internal interface, an external interface, and a forwarding interface on the interface control module; respectively correspondingly one-to-one connecting all the data interfaces of the protected host to a plurality of internal interfaces on the terminal protection device according to interface types; connecting the forwarding interface to the system control module;
   switching on by the hardware control logic module in the terminal protection device a physical circuit between the external interface accessing the external device and the forwarding interface, and keeping a physical circuit between the forwarding interface and the other interfaces in a disconnected state when the external device needs to import data to the protected host; transmitting the imported data to the system control module only via the forwarding interface, so as to control the data interaction between the external device and the protected host; and keeping the protected host in a data isolation state when the external device needs to import data to the protected host;
   switching on by the hardware control logic module a physical circuit between the external interface in the terminal protection device and the system control module;
   performing security authentication on the external device by the system control module, determining whether the external device is a licensed access device;
   disconnecting by the hardware control logic module a physical circuit between the external interface accessing the external device and the other interfaces after the system control module performs security authentication on the external device and determines that the external device is not a licensed access device, so as to filter and forbid the data transmission after the external device is accessed;
   switching on by the hardware control logic module the physical circuit between the external interface accessing the external device and the other interfaces after the system control module performs security authentication on the external device and determines that the external device is a licensed access device;
   performing security detection on the imported data by the system control module when the protected host is in the data isolation state;
   isolating and storing the imported data by an internal memory in the interface control module after the imported data passes the security detection;
   disconnecting by the hardware control logic module a physical circuit between the external interface and the internal memory, and switching on the physical circuit between the internal memory and the internal interface;
   transmitting the imported data in the internal memory to the protected host via the internal interface, in which process the hardware control logic module keeps the physical circuit between the external interface and the forwarding interface, and a physical circuit between the forwarding interface and the internal memory in the disconnected state; and
   receiving the imported data by the protected host via the internal interface.

2. The data forwarding control method according to claim 1, wherein before the step of isolating and storing the imported data by an internal memory in the interface control module, the method further comprises:
   switching on by the hardware control logic module a physical circuit between the forwarding interface and the internal memory of the interface control module, disconnecting physical circuits between the external interface and the forwarding interface, and between the internal memory and the internal interface, and copying the imported data to the internal memory of the interface control module via the forwarding interface.

3. The data forwarding control method according to claim 1, further comprising:
   isolating and storing the exported data by an internal memory in the interface control module when the protected host needs to export data to the external device.

4. The data forwarding control method according to claim 3, wherein before the step of isolating and storing the exported data by an internal memory in the interface control module, the method further comprises:
   switching on by the hardware control logic module a physical circuit between the internal memory and the internal interface, transmitting the exported data in the protected host to the internal memory via the internal interface, and keeping a physical circuit between the internal memory and the other interfaces in the disconnected state.

5. The data forwarding control method according to claim 4, wherein after the step of transmitting the exported data in the protected host to the internal memory via the internal interface, the method further comprises:
   disconnecting by the hardware control logic module the physical circuit between the internal memory and the internal interface, and switching on a physical circuit between the internal memory and the forwarding interface;
   transmitting the exported data in the internal memory to the system control module via the forwarding interface; and
   performing compliance check on the exported data by the system control module, determining whether the exported data complies with a preset compliance policy, and keeping by the hardware control logic module physical circuits between the external interface and the forwarding interface, and between the internal interface and the internal memory in the disconnected state.

6. The data forwarding control method according to claim 5, further comprising:
switching on by the hardware control logic module the physical circuit between the external interface accessing the external device and the forwarding interface after the exported data passes the compliance check; and
copying the exported data to the external device accessed to the external interface, and keeping by the hardware control logic module physical circuits between the forwarding interface and the internal memory, and between the internal interface and the internal memory in the disconnected state.

7. A data forwarding control system, comprising:
one or more external devices,
a protected host, and
a terminal protection device, internally provided with a hardware control logic module, externally connected to the protected host, and taking over all the data interfaces of the protected host, wherein the terminal protection device comprises an interface control module and a system control module; the hardware control logic module, an internal interface, an external interface, and a forwarding interface are located on the interface control module; all the data interfaces of the protected host are respectively correspondingly one-to-one connected to a plurality of internal interfaces on the terminal protection device according to interface types; the forwarding interface is connected to the system control module;
when the external device needs to import data to the protected host, the hardware control logic module is used for: switching on a physical circuit between the external interface accessing the external device and the forwarding interface, and keeping a physical circuit between the forwarding interface and the other interfaces in a disconnected state; transmitting the imported data to the system control module only via the forwarding interface, so as to control the data interaction between the external device and the protected host; and keeping the protected host in a data isolation state when the external device needs to import data to the protected host;

the hardware control logic module is further used for:
switching on by the hardware control logic module a physical circuit between the external interface in the terminal protection device and the system control module;
performing security authentication on the external device by the system control module, determining whether the external device is a licensed access device;
disconnecting by the hardware control logic module the physical circuit between the external interface accessing the external device and the other interfaces after the system control module performs security authentication on the external device and determines that the external device is not a licensed access device, so as to filter and forbid the data transmission after the external device is accessed;
switching on by the hardware control logic module the physical circuit between the external interface accessing the external device and the other interfaces after the system control module performs security authentication on the external device and determines that the external device is a licensed access device;
performing security detection on the imported data by the system control module when the protected host is in the data isolation state;
isolating and storing the imported data by an internal memory in the interface control module after the imported data passes the security detection;
disconnecting by the hardware control logic module a physical circuit between the external interface and the internal memory, and switching on the physical circuit between the internal memory and the internal interface;
transmitting the imported data in the internal memory to the protected host via the internal interface, in which process the hardware control logic module keeps the physical circuit between the external interface and the forwarding interface, and a physical circuit between the forwarding interface and the internal memory in the disconnected state; and
receiving the imported data by the protected host via the internal interface.

* * * * *